Feb. 17, 1948.   C. T. TORRESEN   2,436,185
EXPANDABLE RIVET
Filed Dec. 14, 1942   2 Sheets-Sheet 2

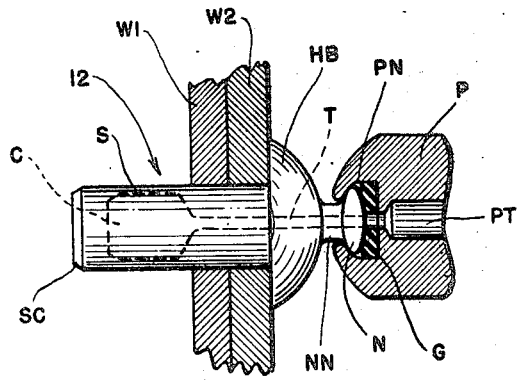
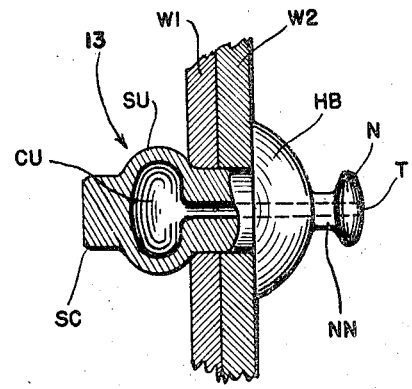
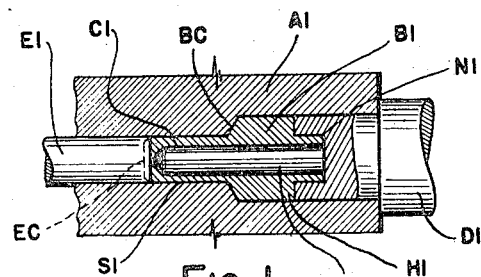
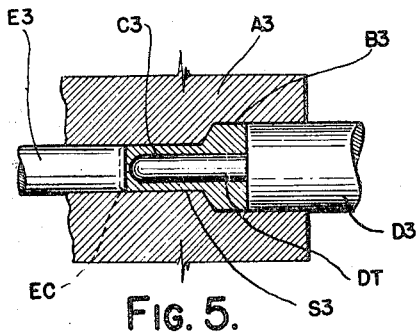
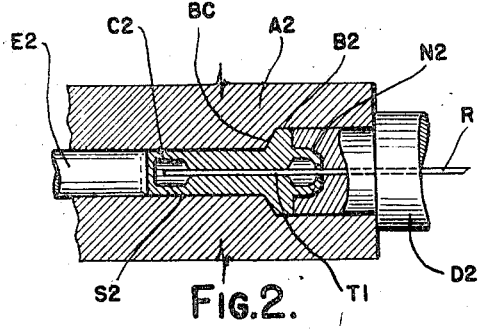
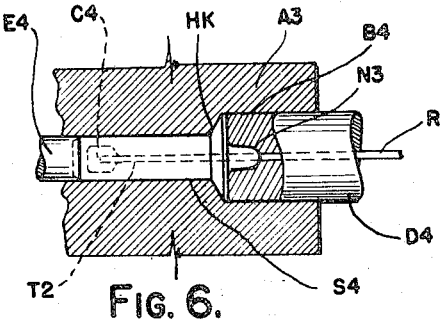
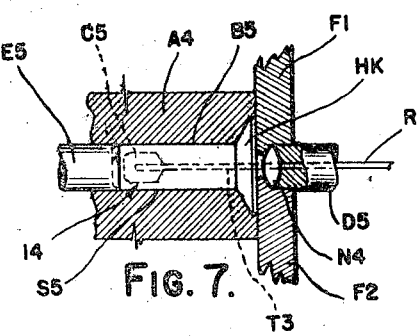

INVENTOR.
CAREL T. TORRESEN
BY
His Attorney.

Patented Feb. 17, 1948

2,436,185

UNITED STATES PATENT OFFICE 2,436,185

EXPANDABLE RIVET

Carel T. Torresen, Santa Monica, Calif., assignor to North American Aviation, Inc., Inglewood, Calif., a corporation of Delaware Application December 14, 1942, Serial No. 468,937

10 Claims. (Cl. 85—40)

The present invention relates to rivets of the expandable type and more particularly to hydrostatically expandable rivets and methods of making and installing such rivets.

In riveting and similar operations where it is required to fasten structural and other elements together, the arrangement of these elements frequently prevents access to the shank portion of the rivet which is required to be upset to complete the riveting operation. Such operations are commonly referred to as "blind" riveting and bolting and numerous expedients to accomplish these results have been suggested and used. In those cases where bolts have been provided for installation from a single side of the work the results have been reasonably satisfactory, although where large and rapid production is required the expense and time involved makes their installation prohibitive. Since such types of "blind" fastening work, as met with in airplane manufacture, usually requires the use of blind rivets, several methods of upsetting the rivet shanks have been proposed and used.

In certain of these prior rivet upsetting methods the shank is tubular and is provided with a mandrel or wire having an enlarged portion which is drawn outwardly as the rivet is held in position thereby upsetting the inner shank portion, after which the mandrel or wire is either withdrawn or cut off and, where necessary, the hole in the rivet head sealed or closed. It has also been suggested to provide a chamber in the inner shank portion filled with an explosive charge which may be set off either by the application of heat or by percussion by striking a hammer pin or other movable element from the head side of the rivet. Each of these types of "blind" riveting have, however, had certain deficiencies and objections and have not proven entirely satisfactory in production methods.

The present invention relates to an improved expanded rivet of the "blind" type in which a recess or cavity is provided in the inner end of the shank and the shank portion upset or expanded by the application of hydrostatic pressure through a channel from the head of the rivet to the cavity, thereby completing the riveting operation. The pressure source may be either pneumatic or hydraulic and is subject to finer control and more uniform results than explosive rivets of known types. The invention also includes novel methods of manufacturing such "blind" rivets as well as the formation of such rivets with nibs or other means for the accommodation of the driving tool through which the hydrostatic pressure is applied. The present rivet is adapted to be manufactured from aluminum and aluminum alloys and other metals.

It is accordingly a principal object of the present invention to provide a hollow shank rivet of the "blind" type which may be expanded by the application of hydrostatic, pneumatic or hydraulic pressure. It is a further object to provide an expandable rivet of a relatively safe and simple type as compared to other "blind" rivets of the tubular and explosive types, and of greater uniformity in final shape and strength.

It is a further object to provide a hydrostatically expandable rivet suitable for use as either a countersunk head, or exposed head type of any desired shape, and which may be installed either in work positions requiring "blind" riveting or where conventional rivets are used. It is a further object of the present invention to provide an improved method of manufacturing expandable rivets of both the countersunk or oval head type as well as an attached nib for the admission of the expanding fluid.

Other objects and advantages of the present invention will become apparent to those skilled in the art after a reading of the present description and the accompanying drawings forming a part hereof, in which:

Fig. 1 is a sectional view showing an early step in the manufacture of an expandable rivet to be provided with a nib projection;

Fig. 2 is a sectional view disclosing a further step in the manufacture of such a rivet;

Fig. 3 shows the same rivet completed and in position with the hydrostatic driving tool applied ready for expanding the same;

Fig. 4 is a partly sectioned view of the rivet of Fig. 3 after it has been expanded;

Fig. 5 is a sectional view of an early step in the forming of a countersunk head rivet with a protruding nib;

Figure 8:
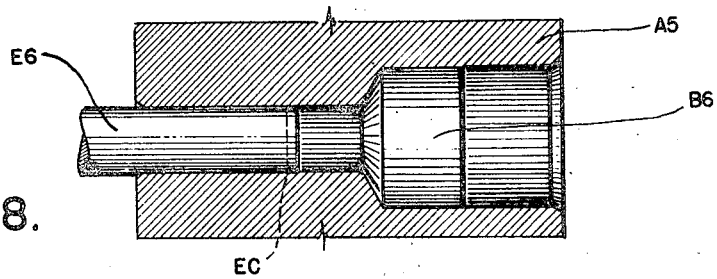
Figure 9:
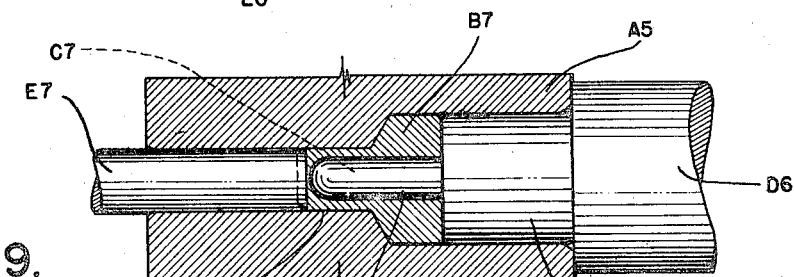
Figure 10:
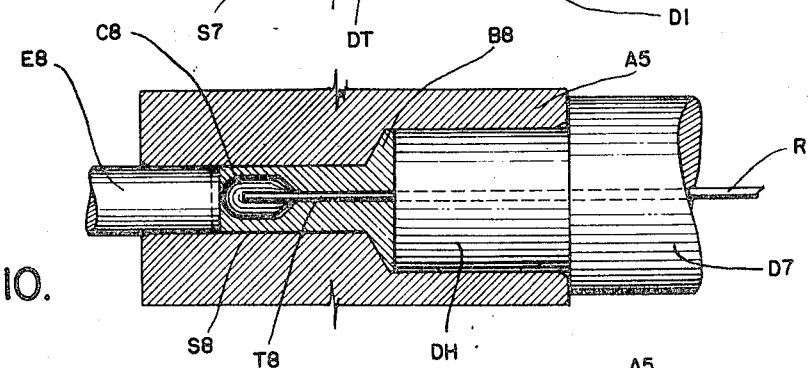
Figure 11:
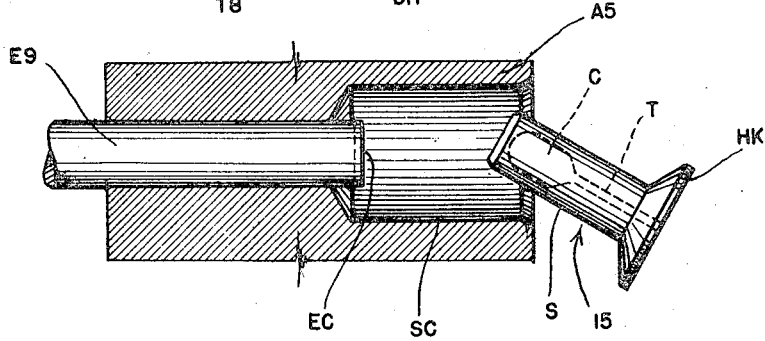

Fig. 6 discloses an intermediate operation in the forming of the same nibbed countersunk head rivet;

Fig. 7 shows a later step in the manufacture of the rivet of Figs. 5 and 6;

Fig. 8 discloses an initial operation in the manufacture of a countersunk head expandable rivet without the nib;

Fig. 9 shows a sectional view of a further step in the formation of this rivet;

Fig. 10 is a sectional view of a still further stage in the formation of the same rivet; and Fig. 11 shows the ejection of the finished countersunk head nibless rivet shown in Figs. 8, 9 and 10.

Referring now to Fig. 1, the numeral A1 represents a cross-section of a fixed die block having an enlarged cylindrical bore on the right side and a co-axial bore of lesser diameter at the opposite side. Both said cylindrical bores are concentric with each other and are joined by the tapered or chamfered portion at BC. A metallic billet of the desired material and of a predetermined volume is initially inserted into the larger bore of the female die block A1. This billet is preferably of a cylindrical shape with a slightly lesser diameter than the larger bore of the die block and is inserted to a position such as that occupied by the billet B6 in the die block A5 shown in Fig. 8. The plunger E1, of a diameter which closely fits the smaller bore of the die block, and having a cupped end EC, is locked in its predetermined position as shown in Fig. 1. A male pressure die or plunger D1 provided with a cylindrical tongue portion DT and a recessed annular portion at N1 in its reduced diameter portion is then brought into position within the larger bore of the die block deforming the billet into the shape shown at B1 in Fig. 1. The rivet may be formed from a billet of either hot or cold material.

It will be noted from Fig. 1 that the tongue portion DT has formed an elongated cylindrical cavity C1 in the rivet blank and the recessed annular portion N1 has assisted in forming a protrusion on the head end of the rivet blank which is subsequently to be formed into the nib. A portion of the material of the initial billet has also been upset and forced into the restricted diameter portion of the die block to form the shank indicated at S1, being chamfered at its inner terminal by the cupped end EC of the rod E1. The volume of the initial billet is very closely predetermined for the particular size of the finished rivet and when the shouldered portion of the pressure die D1 reaches its final position as limited by contact with the face of the die block A1 the material of the original billet has been completely upset and formed into the rivet blank B1.

The pressure die D1 of Fig. 1 is then removed from the die block, the rivet blank B1 is ejected by movement of the plunger E1; the blank may then be annealed and placed in the die block A2 shown in Fig. 2. This die block is similar in form and construction to A1 with the exception that the length of the larger diameter bore is not as great, and its plunger E2 is positioned at a predetermined distance from the face of the die block or other reference point such as the chamfered portion BC. With the needle rod R projecting a predetermined distance beyond the cupped end N2 of the pressure die D2, the latter is moved under pressure into the larger bore of the block, deforming and upsetting the rivet blank by forcing the mass of its material at the enlarged head portion inwardly both toward the end of the shank portion and centrally toward the axis of the rivet blank until it assumes the form shown at B2 in Fig. 2. The rivet blank will now be seen to have its cavity reduced to a relatively small volume as shown at C2 and with lesser material forming the head portion beyond the extended shank diameter, than in the blank B1.

The blank B2 is then ejected after the removal of the pressure die D2 by movement of the ejector plunger E2, the mandrel R remaining in the pressure die as it is withdrawn. The rivet blank B2 may then be annealed and in the event it is desired to make an oval head rivet of the type shown in Fig. 3 blank B1 is placed in a further die block (not shown) provided with a transverse shouldered portion in substitution for the tapered chamfer BC of the previously used die blocks. A cup-shaped pressure male die moves into the die block upsetting the rivet head to form an oval or button head as shown in the enlarged Fig. 3. The mandrel R is then removed from the blank which is ejected from the die block by movement of the plunger E and the formed blank then annealed, or heat-treated in the case of certain alloys, tumbled and preferably given an alumilite or equivalent anodic treatment to finish the expandable rivet which is then ready for use.

When it is desired to manufacture an expandable rivet of the countersunk head type provided with an external nib on the flat head, the above described steps as shown in Figs. 1 and 2 are supplemented by the insertion of the rivet blank B2 of Fig. 2 into a die block A4 as shown in Fig. 7. The face of the latter die block is flush with the face of the finished rivet head HK and the plunger rod E5 is brought up to its predetermined position, at which it backs up the shank of the rivet blank, and is locked at this position. Oppositely moving swaging dies F1 and F2, having their working surfaces curved to form the neck portion of the nib projection, are then brought together as shown in Fig. 7. Simultaneously the pressure plunger die D5, suitably apertured for the rod R, is brought in an axial direction against the outer end of the projecting nib portion N4. The result of these operations is to deform the partly finished nib N2 of the rivet blank B2 shown in Fig. 2, into the finished nib shape N4 of Fig. 7 similar to the elliptical or lentil-shaped nib N shown enlarged on the rivet head of Fig. 4.

The application of the oval head expandable rivet, formed by the above described process of Figs. 1 and 2, is shown in Figs. 3 and 4. The above referred to flat head rivet, as finally formed in Fig. 7, is expanded or applied in substantially the same manner. Reference to Fig. 3 shows the finished oval- or button-head HB of the rivet 12, the shank S of which is chamfered at its inner end at SC and provided with the cavity C, which communicates with the nib N by means of the air passage or tube T. The finished rivet has been positioned within the aligned aperture of the usual diameter providing suitable clearance in the two worksheets or plates W1 and W2 which it is desired be fastened together. A driving tool P having a recessed concave end portion PN of a shape to closely engage the nib N of the rivet is then positioned by a lateral movement upon the nib, bearing against the rubber gasket G in the recessed head of the driving tool. The pressure driving tool P is also provided with an axial cavity PT which becomes aligned with the air passage T through the axis of the rivet. A hydrostatic pressure source communicates with the chamber PT in the drive tool and, while the tool is pressed firmly against the outer surface of the nib N causing the head HB of the rivet to closely bear against the outer surface of the work plate W2, the pressure is released into the communicating passages PT and T by the opening of suitable valve means. This fluid under hydrostatic pressure passes through the aligned passages into the cavity C, being confined by the gasket G, and the pressure of the tool applied against the nib, from leaking out around past the nib N.

When a predetermined hydrostatic pressure has been applied within the cavity C of the rivet 12 of Fig. 3, the walls of the rivet shank become deformed and upset into the shape shown for the rivet 13 in Fig. 4; since the internal pressure within the original cavity is exerted equally in all directions, a shank wall of uniform thickness would result in substantially a spherical form. However, the amount of material at the shank end is considerably greater than that in the walls adjacent the cavity, with the result that the upset shank takes an oblate globose shape having its major axis transverse to that of the rivet, such that the shank wall is distended as shown at SU and the cavity shape CU is somewhat flattened in the axial direction of the rivet. The upsetting of the shank wall into the form shown in Fig. 4 and the referred to flattening of the chamber is caused by the greater lateral deformation due to the exertion of the internal pressure in a radially outward direction from the axis of the rivet which has the effect of drawing the shank end SC slightly toward the worksheets W1 and W2. This serves to draw the sheets tightly together with the pressure being exerted mainly around the edge of the hole in the sheet W1 at the intersection of the shank portion with the upset flattened spherical portion SU.

The pressure driving tool P is then removed laterally from the nib N of the driven rivet and the structural application of the rivet has been completed. In many installations it is not necessary that the nib N be removed from the rivet head. In exposed surfaces such as are commonly found in airplane construction for aerodynamic and other reasons it is desirable that the tip be broken off or removed and that a rivet of the dimpled or countersunk type be used in order to provide a substantially flush outer surface with the worksheet W2. Where necessary the nib may be broken off at the neck by a light blow of a hammer, snipped by a pair of cutting pliers or broken by the removal of the driving tool.

Such countersunk head rivets can be satisfactorily applied either with or without a nib of the type described above. A nibbed or tipped flat countersunk head rivet is preferably formed as shown in Figs. 5, 6 and 7. Referring now to Fig. 5, a hot, or, as the case may be, cold, cylindrical billet of the proper volume is inserted in the die block A3, after the plunger E3 is predeterminedly positioned with respect to a reference point on the die block. A male pressure die D3, having a tongue portion DT, is then moved into the larger bore of the die block upsetting and deforming the billet material into the shape of the die blank B3 shown in Fig. 5. As the pressure die is removed a cavity C3 is formed within the die blank and a chamfered shank end formed corresponding to the cupped end EC of the plunger rod E3. After ejection by the rod E3 the blank is annealed and reinserted in the die block A3, or the intermediate annealing step may be omitted in the event the operations can follow in sufficient succession. The plunger rod E3 has in the meantime been withdrawn to the predetermined position indicated at E4 in Fig. 6, and a cupped male pressure die D4 is inserted together with its mandrel R projecting beyond the die end a predetermined distance. Accordingly, as the rivet blank B3 is positioned in the die block with the plunger D4 the mass of material in the adjacent larger end of the blank will be extruded or forced into the shank portion indicated at S4. This operation reduces the volume of the cavity to that indicated by the dotted lines at C4 and the material closely encloses the mandrel R to form the passageway indicated by the dotted lines at T2. The remaining mass of the material in the adjacent end of the blank is upset and formed into the flat countersunk head portion HK and the protruding nib portion N3.

The rivet blank as shaped at B4 in Fig. 6 is then removed from the die block A3 by the ejecting action of the rod E4 and is placed in a die block A4 as shown in Fig. 7. The face of the latter die block, as described above, is flush with the face of the countersunk rivet head HK and the plunger rod E5 is brought up to a predetermined position where it backs up the shank of the rivet blank. As the blank has been brought from the previous operation the nib N3 is of an outwardly diminishing shape of gradually reducing circular cross-section. This nib N3 is the only portion of the head of the rivet blank which projects beyond the face of the die block A4 or the countersunk surface of the head HK. Oppositely moving swaging dies F1 and F2, having their working surfaces curved to form the neck portion of the nib projection are then brought together as shown in Fig. 7. At the same time a pressure plunger die D5, suitably apertured for the rod R, is brought in an axial direction against the outer end of the projecting nib portion.

The result of these operations is to deform the partly finished nib N3 into the finished nib shape N4 of Fig. 7, similar to the nib N shown enlarged on the oval head rivet in Fig. 4. The rivet blank is then ejected from the die block A4 by withdrawal of the plunger die D5 and the mandrel R, as well as the laterally or vertically opening swaging dies F1 and F2, after which the blank is ejected by movement of the plunger E5. The rivet blank is then annealed and finished by the tumbling and Alumilite anodizing steps referred to in connection with the oval head rivet. The flat countersunk head nibbed rivets are applied or upset in substantially the same manner as the method described above for Figs. 3 and 4.

Figs. 8 to 11 inclusive disclose the major steps in the manufacture of a flat countersunk head rivet of the nibless type also expandable by pneumatic or hydraulic pressure as in the case of the above described rivets. The plunger E6 is inserted in the die block A5 to the predetermined position indicated in Fig. 8, the plunger having a cupped end as at EC. After the plunger is locked in this predetermined position, a hot cylindrical billet of the proper material, temperature and volume is inserted in the larger bore of the female die block A5 as shown in this figure. A pressure plunger D6 having a shouldered intermediate portion DI, as well as a rounded cylindrical tongue portion DT is inserted in the larger bore of the die block A5 and the pressure applied until the shoulder bears against the face of the die block and the original hot billet is deformed into the rivet blank B7, having a central cavity C7, as indicated in Fig. 9. The plunger D6 is then removed and the opposite ejecting plunger moved back to a predetermined position indicated at E8 in Fig. 10, where it is again locked. A male pressure die D7, provided with a mandrel R and a reduced diameter head-forming end portion DH, is then brought into the larger bore of the die block and the pressure applied. In forming the communicating passageway T as the plunger D7 is inserted in the die block prior to the relative position shown in Fig. 10, sufficient pressure is applied to it to extrude the material from the rivet blank B7 around the needle R, which is of sufficient length to touch or nearly touch the bottom of the hollow chamber C8, as shown in this figure. As the pressure is applied to the rivet blank material by further movement of the plunger portion DH, which is integral with the main portion D7, the needle R is preferably inserted at a slightly greater speed than the plunger DH such that it preferably protrudes into the hollow cavity C and does not allow the metal to swell sufficiently to stick to the needle. When the plunger die D7 reaches its terminal position wherein the rivet blank is deformed as at B8, with the final shaped cavity C8, the shank portion S8 and the central communicating passageway formed at T8 by the needle rod R, the pressure die D7 together with its needle R is withdrawn from the die block and the rivet blank B8 permitting the ejecting plunger to be unlocked and moved into its forward position shown at E8 in Fig. 11, thereby ejecting the completely formed rivet 15 as shown in this figure. The rivet 15 is provided with a flat countersunk head HK, the cavity C communicating with the outer face of the head by means of the tube T running coaxially within the shank S. The needle is then removed with the male die element D7 and DH and the rivet 15 can be prepared and finished by the above mentioned annealing, tumbling and Alumilite anodizing steps.

The countersunk head nibless rivet is applied by a different tool, not shown, than that shown for the nibbed rivet in Fig. 3. The rivet gun for this flat head type is preferably provided with a pair of hinged gripping elements, the grip on the rivet head edges being released as the end of the rivet gun is pressed against the rivet head and an intermediate rubber sealing gasket. Pulling of the gun trigger permits hydraulic pressure to be exerted against and into the passage T, forcing the rivet against the workplate and after entering the passage expanding the same in the cavity C in a manner similar to that shown in Fig. 4.

Other modifications and advantages of the present invention both with respect to general arrangement and detailed features which may become apparent to those skilled in the art after a reading of the foregoing specification are each intended to be embraced within the scope and spirit of this invention as more particularly defined in the appended claims.

I claim:

1. An hydraulically expandable rivet of integral construction comprising: a head portion; a shank portion; said shank portion having an enlarged cavity within its end remote from said head portion; open uninterrupted communicating means of relatively smaller diameter than said cavity extending through the intermediate portion of said shank from the surface of said head portion to said cavity; and a mouth portion integrally formed at the junction of said head portion and communicating means adapted for the admission of externally applied fluid pressure to said cavity through said communicating means for the expansion of said shank end portion adjacent said cavity while the diameter of said intermediate shank portion remains substantially unchanged.

2. An hydrostatically expandable rivet of integral construction comprising: a head portion; a shank portion having an enlarged cavity; an uninterrupted communicating passageway of relatively small diameter extending between said cavity and said head portion; and an integrally formed mouth portion at the junction of said passageway with the exposed surface of said head portion adapted to provide an inlet orifice for engagement with an external source of expanding fluid under pressure whereby the shank is expanded adjacent said cavity portion and the remainder is unaffected by said pressure.

3. An hydraulically expandable rivet of unitary structure: comprising a head portion; a shank portion having a cavity at its end portion remote from said head portion; an uninterrupted communicating passageway of relatively small diameter extending between said cavity and an exposed surface of said head portion; and means integrally formed on said head portion adjacent the open end of said communicating passageway adapted for the engagement with an hydraulic means for the expansion of the said end portion only of said shank.

4. A rivet comprising: a head portion; a cylindrical shank portion having an internal cavity; a bulbous portion integral with and projecting from said head portion; and a communicating passageway extending between said cavity and said bulbous portion adapted for the transmission of externally applied fluid pressure therethrough for the expansion of said rivet shank adjacent said cavity.

5. In an hydraulically expandable rivet of one-piece construction, the combination with a head portion and a shank portion having a cavity in uninterrupted axial communication with an exposed surface of said head portion, of means on said exposed head surface being formed such that it is engageable in a fluid-tight relationship with an external source of fluid pressure for the expansion of said shank portion adjacent said cavity.

6. In an hydrostatically expandable homogeneous rivet having co-axial integral head and shank portions, said shank portion having a co-axially disposed cavity and an uninterrupted communicating passageway extending axially from said cavity being of a lesser thickness radially than axially to the end of said shank portion, the outer end wall of said cavity being transversely disposed and its inner wall tapering gradually toward said passageway, and means provided by the external form of the said surface of said head portion whereby fluid pressure applied therethrough within said passageway and said cavity causes expansion of said adjacent shank walls in a direction transverse to said shank axis.

7. In expandable rivet construction the combination with a rivet head, and a shank portion having an enlarged relatively thin-walled interior chamber, of a bulbous protuberance integrally connected with said head by a restricted neck portion and a fluid passageway extending through said protuberance, head and neck portions for the transmission of expansive fluid from said protuberance to said chambered portion of said shank for the expansion of said rivet.

8. In expandable rivet construction, the combination with a rivet head and an integral shank having an enlarged chamber, of a bulbous portion protruding from said rivet head, an integral neck portion connecting said bulbous and head portions, and a fluid passageway extending from an exposed surface of said bulbous portion through said neck, head and shank portions to said chamber adapted for the transmission of fluid pressure for the expansion of the said chambered portion of said shank.

9. An expandable rivet blank comprising a head portion, a shank portion having an enlarged relatively thin-walled fluid chamber, a supplemental head portion interconnected with said first head portion by a reduced neck portion, and a fluid passageway extending from said fluid chamber through said shank, necked and head portions opening upon the outer surface of said supplemental head portion for the application of fluid pressure therethrough.

10. In an hydraulically expanded rivet having a head portion, the combination with an integral shank portion provided with an enlarged internal fluid chamber and a relatively smaller fluid orifice interconnecting said internal fluid chamber with the surface of said head portion, of means integrally formed on said orificed head portion for the attachment of an hydraulic expanding means.

CAREL T. TORRESEN.

REFERENCES CITED

The following references are of record in the file of this patent:

UNITED STATES PATENTS

| Number | Name | Date |
|---|---|---|
| 1,382,906 | Gravell | June 28, 1921 |
| 1,400,401 | Allan | Dec. 13, 1921 |
| 2,030,165 | Huck | Feb. 11, 1936 |
| 2,030,167 | Miller | Feb. 11, 1936 |
| 2,030,171 | Huck | Feb. 11, 1936 |
| 2,054,629 | Huck et al. | Sept. 15, 1936 |
| 2,080,220 | Butter et al. | May 11, 1937 |
| 2,170,556 | Frost | Aug. 22, 1939 |
| 2,183,543 | Cherry | Dec. 19, 1939 |
| 2,302,501 | Mears | Nov. 17, 1942 |
| 2,331,324 | Jakosky | Oct. 12, 1943 |
| 2,342,732 | Gudmundsen | Feb. 29, 1944 |
| 2,342,866 | Jakosky | Feb. 29, 1944 |

FOREIGN PATENTS

| Number | Country | Date |
|---|---|---|
| 4,453 | Great Britain | Feb. 22, 1898 |